(12) United States Patent
Waltermann et al.

(10) Patent No.: US 8,534,844 B2
(45) Date of Patent: Sep. 17, 2013

(54) DYNAMIC KEYSTONE CORRECTION

(75) Inventors: Rod D. Waltermann, Rougemont, NC (US); Scott Edwards Kelso, Cary, NC (US); John Carl Mese, Cary, NC (US); Nathan J. Peterson, Raleigh, NC (US); Arnold S. Weksler, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 436 days.

(21) Appl. No.: 12/987,639

(22) Filed: Jan. 10, 2011

(65) Prior Publication Data

US 2012/0176587 A1   Jul. 12, 2012

(51) Int. Cl.
*G03B 21/14*   (2006.01)

(52) U.S. Cl.
USPC ............... 353/69; 353/30; 353/31; 353/70; 353/121; 356/602; 356/603; 348/746; 348/747

(58) Field of Classification Search
USPC .......... 353/30, 31, 46, 69, 70, 121; 356/493, 356/496, 498, 602, 603, 606; 349/5, 7–9; 348/744–747
See application file for complete search history.

(56) References Cited

U.S. PATENT DOCUMENTS

| | | | | |
|---|---|---|---|---|
| 6,416,186 B1 * | 7/2002 | Nakamura | ...................... | 353/69 |
| 7,182,464 B2 * | 2/2007 | Ejiri et al. | ........................ | 353/69 |
| 8,322,862 B2 * | 12/2012 | Nara | ................................ | 353/69 |
| 2005/0012907 A1 * | 1/2005 | Inoue | ................................ | 353/70 |
| 2006/0038962 A1 * | 2/2006 | Matsumoto et al. | ............ | 353/69 |
| 2007/0273795 A1 * | 11/2007 | Jaynes et al. | .................. | 348/745 |
| 2009/0115916 A1 * | 5/2009 | Kondo et al. | ................. | 348/745 |
| 2011/0069284 A1 * | 3/2011 | Furui | .............................. | 353/70 |

* cited by examiner

*Primary Examiner* — Georgia Y Epps
*Assistant Examiner* — Sultan Chowdhury
(74) *Attorney, Agent, or Firm* — Kunzler Law Group (57) ABSTRACT

An apparatus and method are disclosed for dynamic keystone correction. A measurement module measures distances from a projector to each of at least three projected points of a first projected image projected on a first surface with projection angles between each projected point. The at least three projected points are endpoints for at least two vectors with a target ratio of vector lengths. An adjustment module calculates an actual ratio of actual vector lengths of the at least two vectors. The adjustment module further adjusts a first aspect ratio of first projected image until the actual ratio is equivalent to the target ratio.

20 Claims, 9 Drawing Sheets

DYNAMIC KEYSTONE CORRECTION

FIELD

The subject matter disclosed herein relates to keystone correction and more particularly relates to dynamic keystone correction of a projected image.

BACKGROUND

Description of the Related Art

A projector used to project a digital image on a surface. Unfortunately, if a central axis of the projector is not normal to the surface, the projected digital image may be distorted. This distortion is often referred to as keystoning. The projected digital image may also be distorted if the surface is comprised of varying textures, varying reflective qualities, and/or sub surfaces that are not co-planar.

BRIEF SUMMARY

Based on the foregoing discussion, the inventors have recognized a need for an apparatus and method of dynamic keystone correction. Beneficially, such an apparatus, system, and method would dynamically correct a distorted projected image.

The embodiments of the present invention have been developed in response to the present state of the art, and in particular, in response to the problems and needs in the art that have not yet been fully solved by currently available keystone correction methods. Accordingly, the embodiments have been developed to provide an apparatus and method for dynamic keystone correction that overcome many or all of the above-discussed shortcomings in the art.

The apparatus for dynamic keystone correction is provided with a plurality of modules that functionally execute the necessary steps of measuring a distance, calculating an actual ratio, and adjusting a first aspect ratio. These modules in the described embodiments include a measurement module and an adjustment module.

The measurement module measures distances from a projector to each of at least three projected points of a first projected image projected on a first surface with projection angles between each projected point. The at least three projected points are endpoints for at least two vectors with a target ratio of vector lengths.

The adjustment module calculates an actual ratio of actual vector lengths of the at least two vectors. The adjustment module further adjusts a first aspect ratio of first projected image until the actual ratio is equivalent to the target ratio.

A method is also presented for dynamic keystone correction. The method in the disclosed embodiments substantially includes the steps necessary to carry out the functions presented above with respect to the operation of the described apparatus.

A measurement module measures distances from a projector to each of at least three projected points of a first projected image projected on a first surface with projection angles between each projected point. The at least three projected points are endpoints for at least two vectors with a target ratio of vector lengths.

An adjustment module calculates an actual ratio of actual vector lengths of the at least two vectors. The adjustment module further adjusts a first aspect ratio of first projected image until the actual ratio is equivalent to the target ratio.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
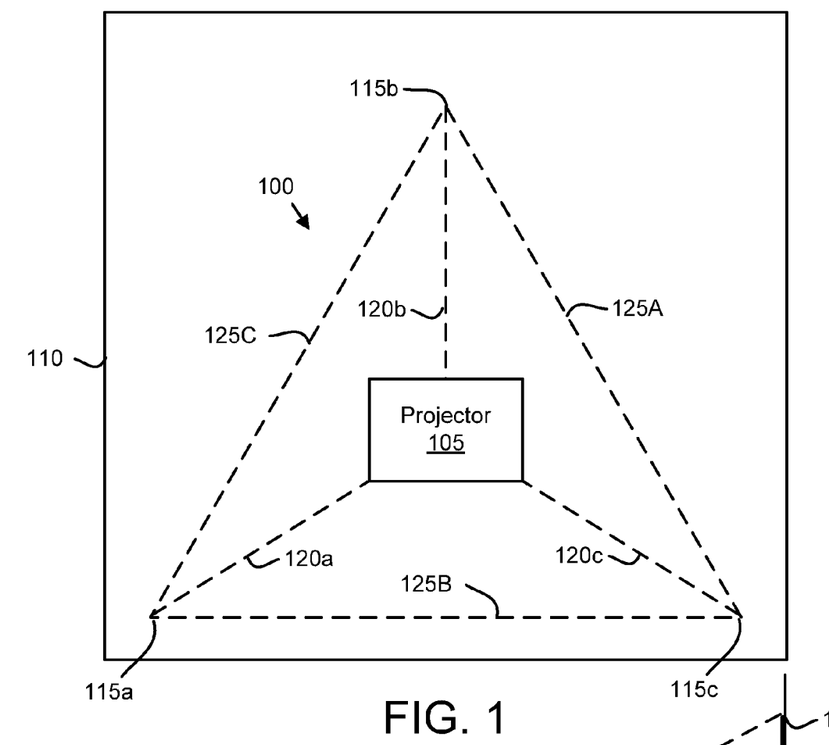
FIG. 1 is a front view drawing illustrating one embodiment of a projected image.

FIG. 1 is a front view drawing illustrating one embodiment of a projected image 100. A projector 105 projects the projected image 100 on a surface 110. In the depicted embodiment, a projector central vector of the projector 105 is normal to the surface 110.

The projected image 100 comprises at least three undistorted projected points 115. There is a projection angle between each undistorted projected point 115. The undistorted projected points 115 are endpoints for undistorted vectors 125. The undistorted vectors 125 are between each of the endpoints 115 and have vector lengths. In one embodiment, at least two undistorted vectors 125 have a target ratio of vector lengths. The target ratio may be calculated as a first vector length divided by a second vector length, such as 2.4/2. In the depicted embodiment, the target ratio of vector lengths is 1. In alternate embodiments, the target ratio may be expressed as 1:1, 1/1, 1:1:1.2, or the like.

In one embodiment, the projector 105 renders the projected image 100 with at least one laser beam. The laser beam may be reflected by a minor to traverse the surface 110. For example, the laser beam may horizontally traverse or scan the surface 110 along a first vertical row, then horizontally traverse or scan the surface 110 along a second vertical row. In a certain embodiment, the projector 105 renders the projected image 100 with at least three laser beams, each laser beam of a different color.

Figure 2:
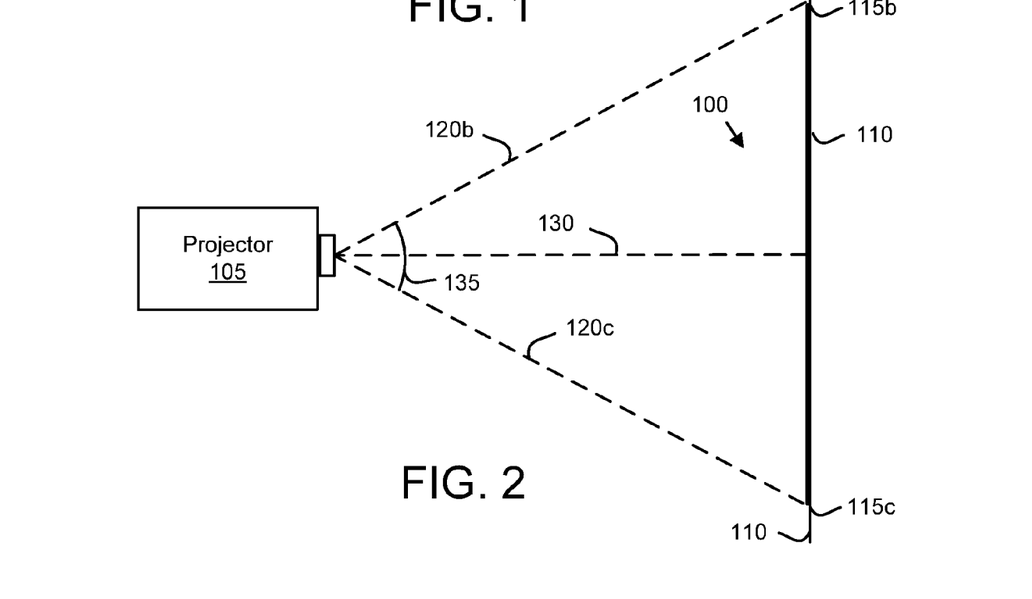
FIG. 2 is a side view drawing illustrating one embodiment of a projected image.

FIG. 2 is a side view drawing illustrating one embodiment of a projected image 100. The projected image 100 and projector 105 may be the projected image 100 and projector 105 of FIG. 1. The description of the projected image 100 refers to elements of FIG. 1, like numbers referring to like elements. The central projection vector 130 is normal to the surface 110. In one embodiment, the projected image 100 is rendered as intended without correction when the central projection vector 130 is normal to the surface 110.

A projection angle A 135 is also shown between a second undistorted projected point 115b and a third undistorted projected point 115c. A projection angle 135 is determined between each undistorted projected point 115.

Figure 3:
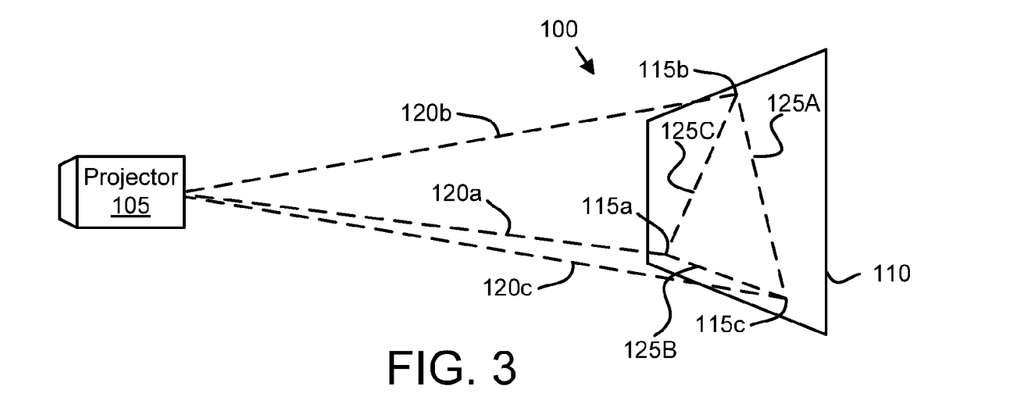
FIG. 3 is a perspective view drawing illustrating one embodiment of a projected image.

FIG. 3 is a perspective view drawing illustrating one embodiment of a projected image 100. The projected image 100 and projector 105 may be the projected image 100 and projector 105 of FIGS. 1 and 2. The description of the projected image 100 refers to elements of FIGS. 1 and 2, like numbers referring to like elements. In the depicted embodiment, the central projection vector 130 is normal to the surface 110. As a result, the undistorted projected points 115 are rendered without distortion.

Figure 4:
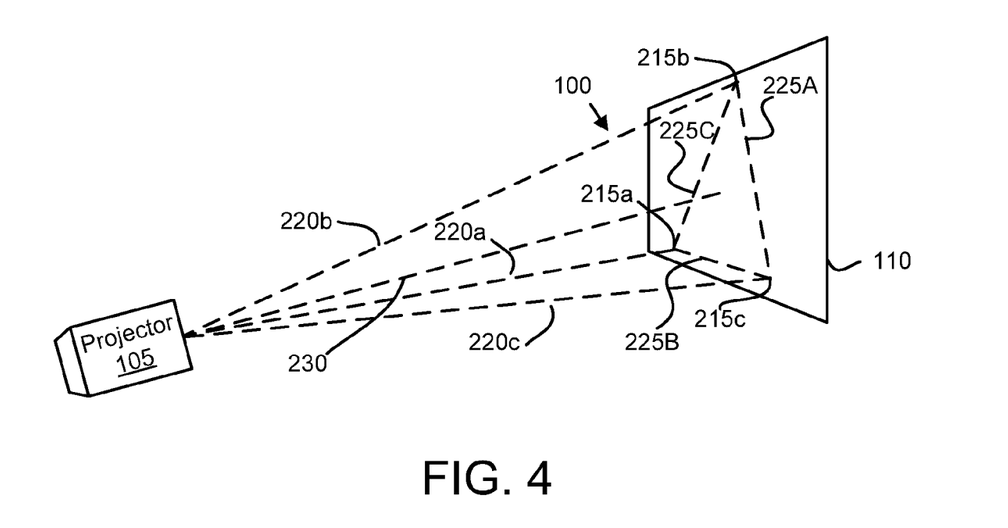
FIG. 4 is a perspective view drawing illustrating one embodiment of a projected image from a modified projection position.

FIG. 4 is a perspective view drawing illustrating one embodiment of a projected image 100 from a modified projection position. The projected image 100 and projector 105 may be the projected image 100 and projector 105 of FIG. 3. The description of the projected image 100 refers to elements of FIGS. 1-3, like numbers referring to like elements.

The projector 105 is shown projecting the projected image 100 from a modified position. As a result, the undistorted projection points 115 of FIGS. 1-3 are rendered in distorted positions, referred to hereafter as projection points 215. The projection points 215 are endpoints for vectors 225 that are coplanar with the surface 110 between the projected points 215. A central projection vector 230 of the projector 100 in a modified projection position is not normal to the surface 110.

The projector 105 measures distances 220 from the projector 105 to each of the projected points 215. The projector 105 may measure the distances 220 to a projected point 215 as a time for the laser beam to travel to the projected point 215 and return to the projector 105.

In one embodiment, each of the three projected points 215 is individually projected on the surface 110. The projector 105 may measure the distance 220 from the projector 105 to the projected point 215 as the projected point 215 is projected on the surface 110.

Figure 5:
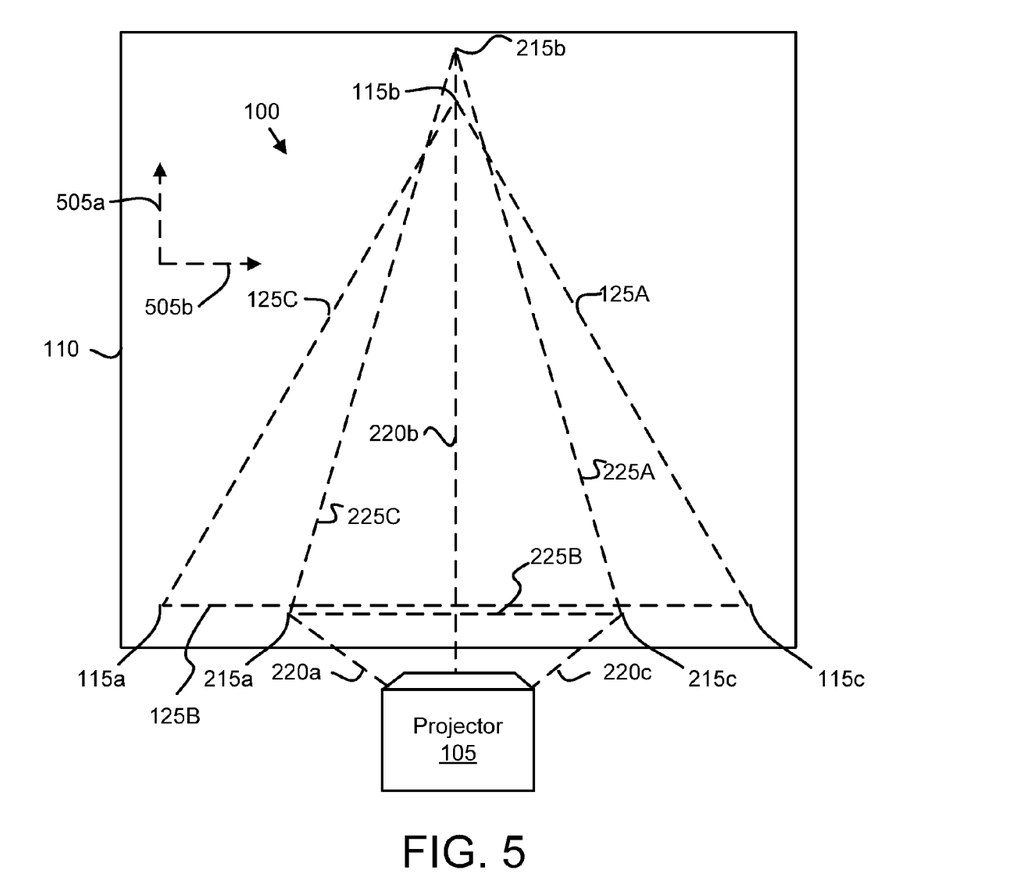
FIG. 5 is a front view drawing illustrating one embodiment of a projected image from a modified projection position.

FIG. 5 is a front view drawing illustrating one embodiment of the projected image 100 from the modified projection position. The projected image 100 may be the projected image of FIG. 4 and the projector 105 may be the projector of FIG. 4 in the modified projection position. The description of the projected image 100 refers to elements of FIGS. 1-4, like numbers referring to like elements.

The projected points 215 and vectors 225 of FIG. 4 are shown as projected from the projector 105. The undistorted projected points 115 and the undistorted vectors 125 of FIGS. 1-3 are also shown if the projected image 100 is projected from the original position of FIGS. 1-3.

In the depicted embodiment, the modified projection position is below a plane of the central projection vector 130. As a result, the projected image 100 is elongated in a vertical direction 505a and shortened in a horizontal direction 505b.

Figure 6:
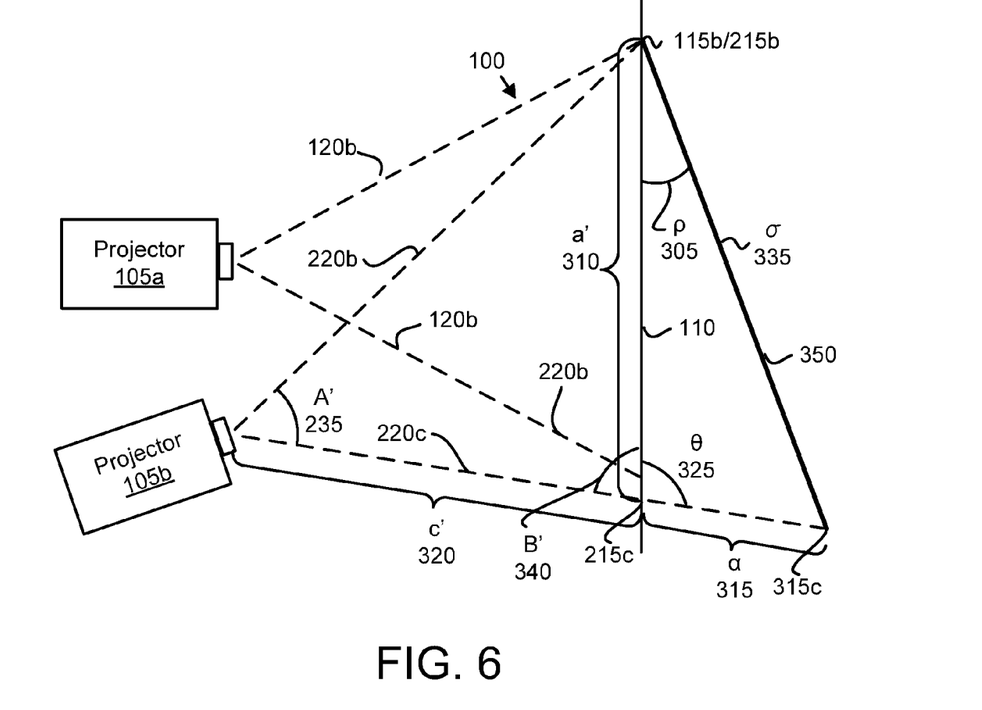
FIG. 6 is a side view drawing illustrating one embodiment of projected images.

FIG. 6 is a side view drawing illustrating one embodiment of projected images 600. The projected image 100 of FIGS. 1-5 is shown with a first projector 105a positioned as in FIGS. 1-3 and a second projector 105b positioned in the modified projection position. The description of the projected images 100 refers to elements of FIGS. 1-5, like numbers referring to like elements. The central projection vector 130 of the first projector 105a is normal to the surface 110 and the central projection vector 230 of the second projector 105b is at not normal to the surface 110 as shown in FIGS. 2 and 4.

In one embodiment, the projected image 100 is adjusted so that a second projected point 215b is rendered on the surface 110 in the same point on the surface 110 that the second undistorted point 115b would be rendered. Thus, if the second projector 105b simulated projecting the projected image 100 on a virtual surface 350 that is planar and normal to the central projection vector 230 of the second projector 105b and with the second projected point 215b located in the position of the second undistorted projected point 115b, then a virtual vector σ335 between the second projected point 215b and a third virtual projected point 315c on the virtual surface 350 maybe simulated by the second projector 105b, along with a pivot angle ρ305, and angle θ325, and a distance a 315. The length of the virtual vector σ335 is equal to the length of the second undistorted vector 125A of FIG. 1.

The second projector 105b determines an angle A 235 between the second projected point 215b and a third projected point 215c. In one embodiment, the angle A 235 is stored by the projector 105. In an alternate embodiment, the angle A 235 may be calculated using Equation 1, where b is the second distance 220b, c is the third distance 220c, and A is the projection angle 135.

$$A' = \text{Cos}^{-1}\left(\frac{b^2 - c^2 + 2bc\text{Cos}(A)}{2b^2}\right) \quad \text{Equation 1}$$

In a certain embodiment, the second projector 115b determines the angle A 235 using Equation 2, where d is a simulated distance calculated from the pixel positions of the second projected points 215b and the third projected point 215c and e is length of a simulated virtual focal length vector from the second projector 105 be to a midpoint of a simulated vector between the pixel positions of the second projected points 215b and the third projected point 215c.

$$A = \tan^{-1}(d/2e) \quad \text{Equation 2}$$

The second projector 105b further calculates a second distance 220b to the second projected point 215b and a third distance 220c to the third projected point 215c. The second projector 105b may calculate angle B' 340 using Equation 3, where b is the second distance 220b, c' is the third distance 220c.

$$B' = \text{Sin}^{-1}\left(\frac{b\text{Sin}(A')}{\sqrt{b^2 + c'^2 - 2bc'\text{Cos}(A')}}\right). \quad \text{Equation 3}$$

In addition, the second projector 105b may calculate the length a' 310 using Equation 4.

$$a' = \frac{b\text{Sin}(A')}{\text{Sin}(B')} \quad \text{Equation 4}$$

One of skill in the art will recognize that lengths for each of the vectors 225 may be calculated in a similar manner. In one embodiment, the second projected point 215b is rotated the location of the second undistorted projected point 115b by applying calculating the pivot angle ρ 305 using Equations 5-7.

$$\alpha = b - c' \quad \text{Equation 5}$$

$$\theta = 180 - \left(\frac{b\text{Sin}(A')}{\sqrt{b^2 + c'^2 - 2bc'\text{Cos}(A')}}\right) \quad \text{Equation 6}$$

$$\rho = \text{Sin}^{-1}\left(\frac{\alpha\text{Sin}(\theta)}{\sqrt{2b^2 - 2b^2(\text{Cos}(A'))}}\right) \quad \text{Equation 7}$$

The coordinates r of the projected image 100 are then rotated as shown in Equation 8.

$$r\begin{bmatrix} \text{Cos}(\rho) & \text{Sin}(\rho) & 0 \\ -\text{Sin}(\rho) & \text{Cos}(\rho) & 0 \\ (1-\text{Cos}(\rho)x_r + y_r\text{Sin}(\rho) & (1-\text{Cos}(\rho)y_r - x_r\text{Sin}(\rho) & 1 \end{bmatrix} \quad \text{Equation 8}$$

Alternatively, coordinates r of the projected image 100 are scaled and rotated so that the second projected point 215b is in the location of the second undistorted projected point 115b as shown in Equation 9, where $S_x$ and $S_y$ are scaling factors in the horizontal direction 505b and vertical direction 505a respectively.

$$r\begin{bmatrix} S_x\cos^2(\rho) + S_y\sin^2(\rho) & (-S_x + S_y)\sin(\rho)\cos(\rho) & 0 \\ (-S_x + S_y)\sin(\rho)\cos(\rho) & S_x\sin^2(\rho) + S_y\cos(\rho) & 0 \\ 0 & 0 & 1 \end{bmatrix} \quad \text{Equation 9}$$

Figure 7:
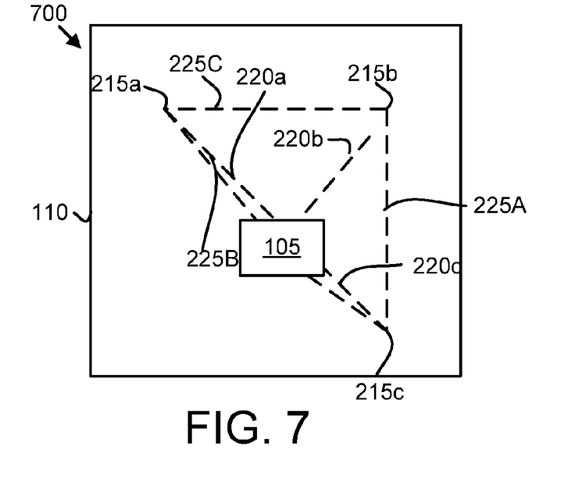
FIG. 7 is a front view drawing illustrating one embodiment of an alternate projected image.

FIG. 7 is a front view drawing illustrating one embodiment of an alternate projected image 700. The projector 105 of FIGS. 1-6 is shown projecting and an isosceles triangle on the surface 110. The description of the alternate projected image 700 refers to elements of FIGS. 1-6, like numbers referring to like elements. The alternate projected image 700 is defined by three projected points 215. As described for FIG. 6, Equations 1-9 may be used to calculate lengths for at least two vectors 225 between the projected points 215.

Figure 8:
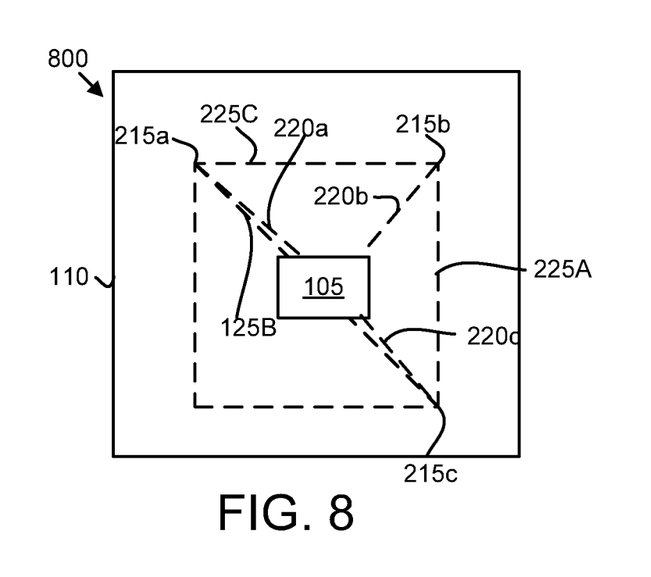
FIG. 8 is a front view drawing illustrating one embodiment of another alternate projected image.

FIG. 8 is a front view drawing illustrating one embodiment of an alternate projected image 800. The projector 105 of FIGS. 1-7 is shown projecting and a square on the surface 110 of FIGS. 1-7. The description of the alternate projected image 800 refers to elements of FIGS. 1-7, like numbers referring to like elements. The alternate projected image 800 is defined by four projected points 215. As described for FIG. 6, Equations 1-9 may be used to calculate lengths for at least two vectors 225 between the projected points 215.

Figure 9:
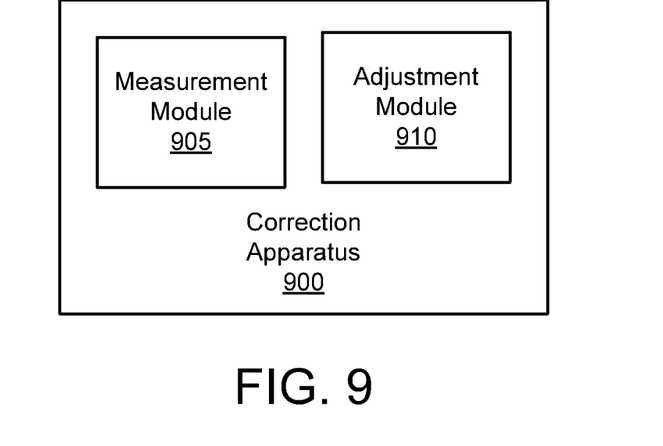
FIG. 9 is a schematic block diagram illustrating one embodiment of a correction apparatus.

FIG. 9 is a schematic block diagram illustrating one embodiment of a correction apparatus 900. The correction apparatus 900 may be embodied in the projector 105 of FIGS. 1-8. The description of the correction apparatus 900 refers to elements of FIGS. 1-8, like numbers referring to like elements. The correction apparatus 900 includes a measurement module 905 and an adjustment module 910.

The measurement module 905 measures the distances 220 from the projector 105 to each of at least three projected points 215 of the projected image 100, 700, 800 projected on the surface 110 with projection angles 235 between each projected point 215. The at least three projected points 215 are endpoints for at least two vectors 225 with a target ratio of vector lengths.

In one embodiment, the target ratio is a value stored on the measurement module 905. For example, a target ratio may be the value one (1) and maybe storage in a nonvolatile memory. In an alternate embodiment, the adjustment module 910 may calculate the target ratio for the projected image 100 from a simulated projected image 100 on a virtual surface 350 that is planar and normal to the central projection vector 230 of the projector 105. The target ratio also may be a string of values such as 1, 1.2, 1.3, with a value for each vector 225.

In one embodiment, the measurement module 905 measures the distances 220 to each projected point 215 as a time for the laser beam to travel to the projected point 215 and return to the projector 105. The measurement module 905 may measure the distances 120 using a measurement method selected from the group consisting of laser Doppler velocimetry measurements, time-of-flight measurements, phase shift measurements, and interferometer measurements.

The adjustment module 910 calculates an actual ratio of actual vector lengths a' 310 of the at least two vectors 225 between the projected points 215 as described for FIG. 6. The adjustment module 910 further adjusts an aspect ratio of projected image 100, 700, 800 until the actual ratio is equivalent to the target ratio. The adjustment of the aspect ratio will be described hereafter in more detail.

Figure 10:
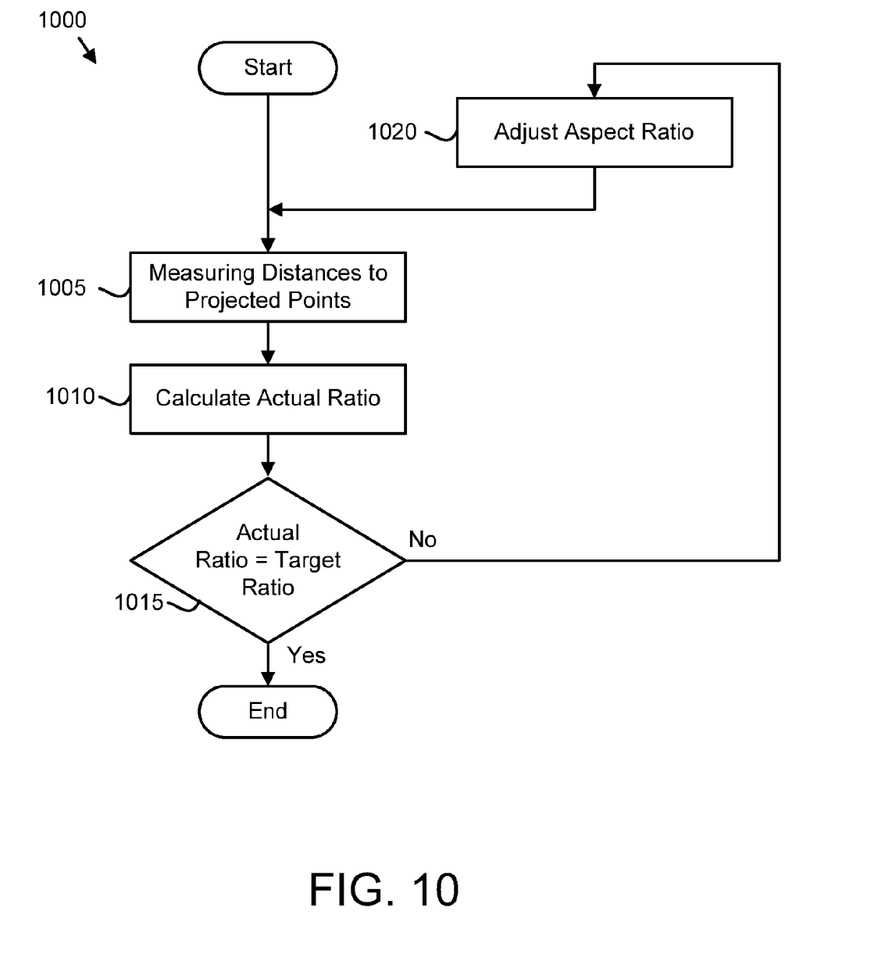
FIG. 10 is a schematic flow chart diagram illustrating one embodiment of a keystone correction method.

FIG. 10 is a schematic flow chart diagram illustrating one embodiment of a keystone correction method 1000. The method 1000 may be a machine implemented method. In one embodiment, the method 1000 may be implemented with computer readable program code stored on a computer readable medium and executed by a processor. The method 1000 may implement the functions described for the apparatus 900 of FIG. 9. The description of the method 1000 refers to elements of FIGS. 1-9, like numbers referring to like elements.

The method starts, and in one embodiment, the measurement module 905 measures 1005 the distances 220 from the projector 105 to each of at least three projected points 215 of the projected image 100, 700, 800 projected on the surface 110 with projection angles 235 between each projected point 215. The at least three projected points 215 are endpoints for the at least two vectors 225 with the target ratio of vector lengths.

The adjustment module 910 calculates 1010 an actual ratio of actual vector lengths 310 of the at least two vectors 225 between the projected points 215. In one embodiment, the adjustment module 910 calculates 1010 the actual ratio by calculating vector lengths for the at least two vectors 225 using Equations 1-9 and comparing the lengths. In one embodiment a first vector length is divided by a second vector length. Alternatively, the vector lengths are proportionately scaled so that the smallest vector length is 1, such as 1.2:1.2:1.

The adjustment module 910 determines 1015 if the actual ratio is equivalent to the target ratio. If the actual ratio is equivalent to the target ratio, the method 1000 ends. If the actual ratio is not equivalent to the target ratio, the adjustment module 910 adjusts 1020 an aspect ratio of the projected image 100, 700, 800 until the actual ratio is equivalent to the target ratio. In one embodiment, the adjustment module 910 iteratively adjusts 1020 the aspect ratio of the projected image 100, 700, 800 until the actual ratio is equivalent to the target ratio.

In one embodiment, the actual ratio is equivalent to the target ratio if the actual ratio is within a threshold percentage of the target ratio. For example, if the threshold percentage is 5% and the target ratio is one (1), the actual ratio may be equivalent to the target ratio if the actual ratio is in the range of 0.95 to 1.05, such as 1.03. In one embodiment, the threshold percentage is in the range of 0 to 10%. In an alternate embodiment, the threshold percentage is in the range of 0 to 3%.

Figure 11:
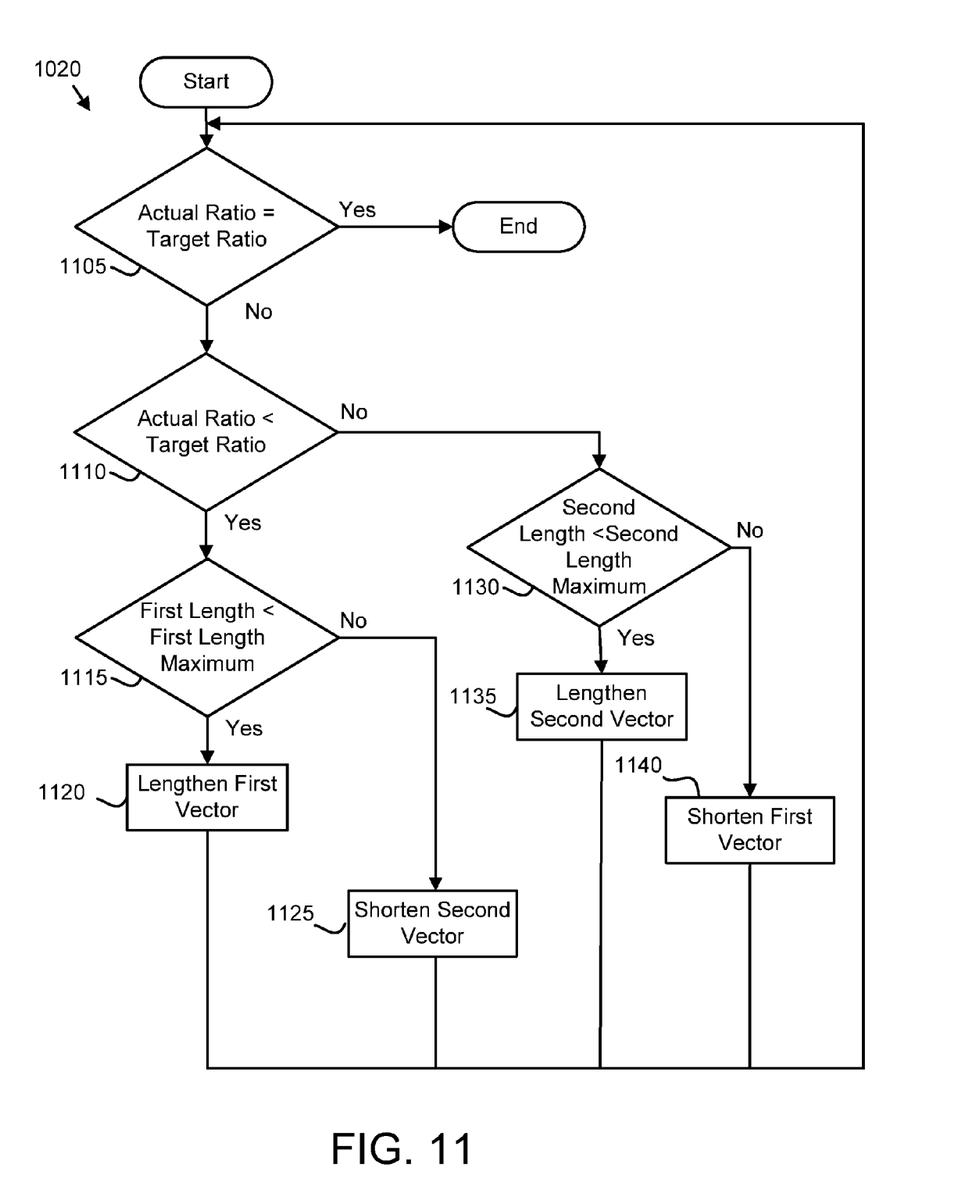
FIG. 11 is a schematic flow chart diagram illustrating one embodiment of an aspect ratio adjustment method.

FIG. 11 is a schematic flow chart diagram illustrating one embodiment of an aspect ratio adjustment method 1020. The method 1020 may be the adjust aspect ratio step 1020 of FIG. 10. The method 1000 may implement the functions described for the apparatus 900 of FIG. 9. The description of the method 1020 refers to elements of FIGS. 1-10, like numbers referring to like elements.

The method 1020 starts, in one embodiment, the adjustment module 910 determines 1105 if the actual ratio is equivalent in to the target ratio. The actual ratio may be calculated using the method 1000 of FIG. 10. The actual ratio may be equivalent to the target ratio if the actual ratio is within the threshold percentage of the target ratio. If the actual ratio is equivalent to the target ratio, the method 1020 ends.

If the actual ratio is not equivalent to the target ratio, the adjustment module 910 may determine 1110 if the actual ratio is greater than the target ratio. If the actual ratio is greater than the target ratio, the adjustment module 910 may determine 1115 if a first vector length of the first vector 225A is less than a first length maximum.

In one embodiment, the first length maximum may be stored in the projector 105. Alternatively, the first length maximum may be calculated by the adjustment module 910. The first length maximum may be the greatest length of the first vector 225A that the projector 105 can render.

If the first vector length is less than a first length maximum, the adjustment module 910 may adjust the aspect ratio of the projected image 100, 700, 800 to lengthen 1120 the first vector 225A. After lengthening 1120 the first vector 225A, the adjustment module 210 determines 1105 if the actual ratio is equivalent in to the target ratio.

If the adjustment module 910 determines 1115 that the first vector length is not less than the first length maximum, the adjustment module 910 may adjust the aspect ratio of the projected image 100, 700, 800 to shorten 1125 the second vector 225B. After shortening 1125 the second vector 225B, the adjustment module 210 determines 1105 if the actual ratio is equivalent in to the target ratio.

If the adjustment module 910 determines 1110 that the actual ratio is not greater than the target ratio, the adjustment module 910 may determine 1130 if a second vector length of a second vector 225B is less than a second length maximum.

In one embodiment, the second length maximum may be stored in the projector 105. Alternatively, the second length maximum may be calculated by the adjustment module 910. The second length maximum may be the greatest length of the second vector 225B that the projector 105 can render.

If the second vector length is less than the second length maximum, the adjustment module 910 may adjust the aspect ratio of the projected image 100, 700, 800 to lengthen 1135 the second vector 225B. After lengthening 1135 the second vector 225B, the adjustment module 210 determines 1105 if the actual ratio is equivalent in to the target ratio.

If the second vector length is not less than the second length maximum, the adjustment module 910 may adjust the aspect ratio of the projected image 100, 700, 800 to shorten 1140 the first vector 225A. After shortening 1140 the first vector 225A, the adjustment module 210 determines 1105 if the actual ratio is equivalent in to the target ratio.

The adjustment module 910 may adjust the aspect ratio by adjusting a pixel aspect ratio. For example, to increase an aspect ratio in the horizontal 505a direction, the adjustment module 910 may increase a pulse width of a laser rendering each pixel. Alternatively, the adjustment module 910 may adjust the aspect ratio by adjusting intra-pixel spacing. For example, the adjustment module 910 may increase a spacing between horizontal scan lines to increase the aspect ratio in a vertical 505a direction.

In a certain embodiment, the adjustment module 910 adjusts the aspect ratio by adjusting a pixel shape. For example, to increase the aspect ratio in the vertical direction 505a.

In one embodiment, the method 1020 iteratively adjusts the aspect ratio of the projected image 100, 700, 800 until the actual ratio is equivalent to the target ratio. In addition, by iteratively adjusting the aspect ratio of the projected image 100, 700, 800, the method 1000 of FIG. 10 and the method 1020 of FIG. 11 may reduce and/or eliminate the distortion of the projected image 100, 700, 800 if the projector 105 is moving. For example, the projector 105 may be handheld. By adjusting the aspect ratio of the projected image 100, 700, 800, the embodiments may correct the projected image 100, 700, 800 even if the projector 105 is moving.

Figure 12:
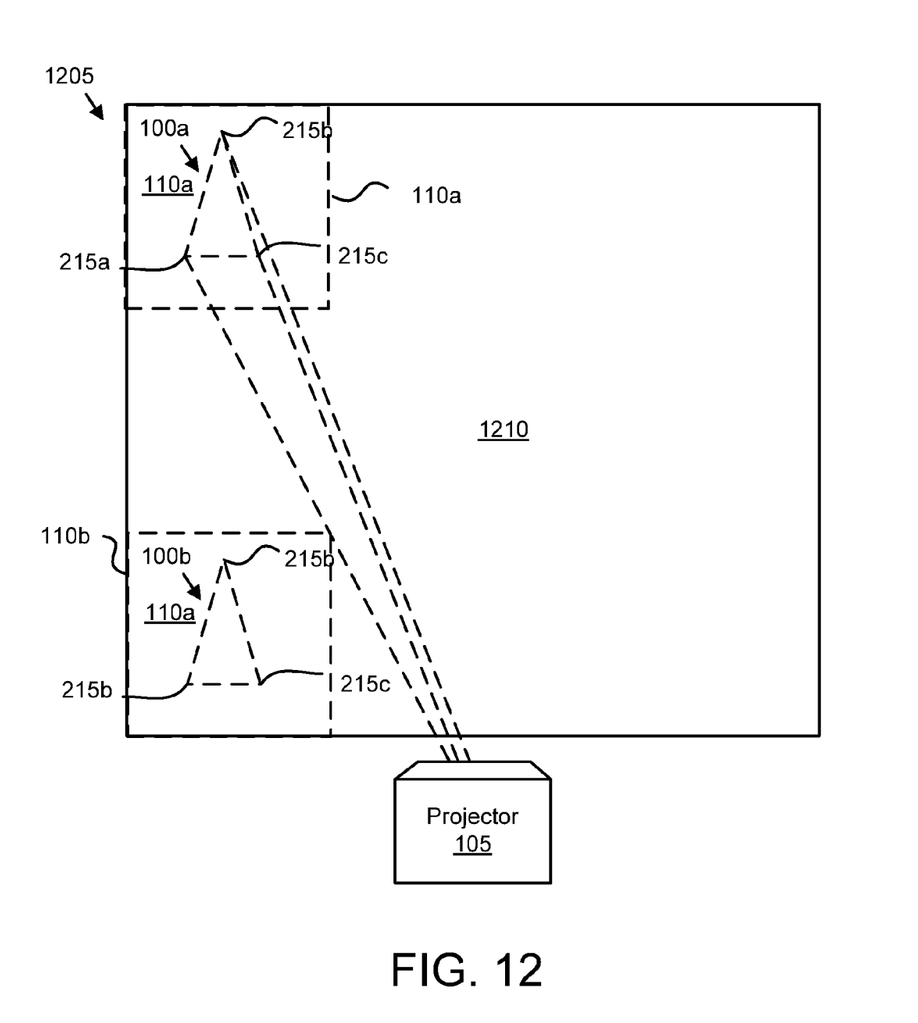
FIG. 12 is a front view drawing illustrating one embodiment of a plurality of projected images on a global surface.

FIG. 12 is a front view drawing illustrating one embodiment of a plurality of projected images 100 on a global surface 1210. In one embodiment, the surface 110 of FIGS. 1-8 may be surfaces 110 of a plurality of surfaces 110 that make up the global surface 1210. A global projected image 1205 is made up of a plurality of projected images 100 projected on the global surface 1210. For simplicity, only two projected images 100 are shown, but one of skill in the art will recognize that the embodiment may be practiced with any number of projected images 100.

The correction apparatus 900 may correct a first projected image 100a with projected points 215 that are projected on the first surface 110a. Similarly, the correction apparatus 900 may correct a second projected image 100b that is projected on a second surface 110b of the global surface 1210. The plurality of projected images 100 may form the global image 1205.

Figure 13:
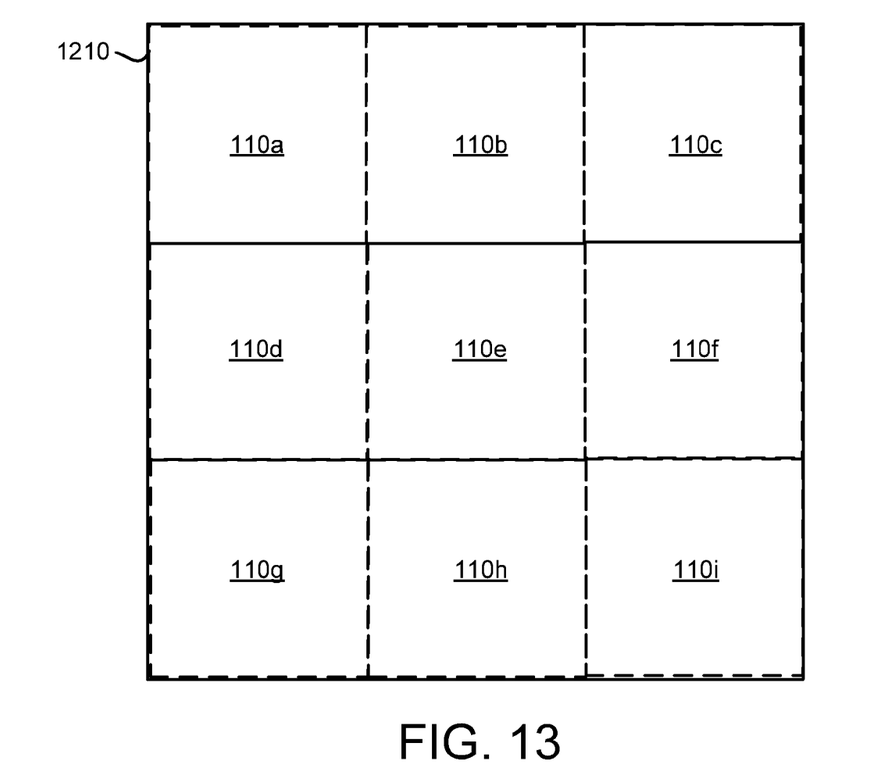
FIG. 13 is a front view drawing illustrating one embodiment of surfaces of a global surface.

FIG. 13 is a front view drawing illustrating one embodiment of surfaces 1210 of the global surface 1210. The global surface 1210 of FIG. 12 is shown tessellated with a plurality of surfaces 110. A distinct projected image 100 may be projected on each of the surfaces 110 as shown in FIG. 12. The adjustment module 910 may adjust an aspect ratio for each projected image 100 to form the global projected image 1205. Because each projected image 100 is corrected for each of the surfaces 110, the global projected image 1205 may be correctly proportioned even if the global surface 1205 is irregular.

In an alternate embodiment, the plurality of surfaces 110 may cover the global surface 1205 such that each surface 110 overlaps one or more other surfaces 110.

Figure 14:
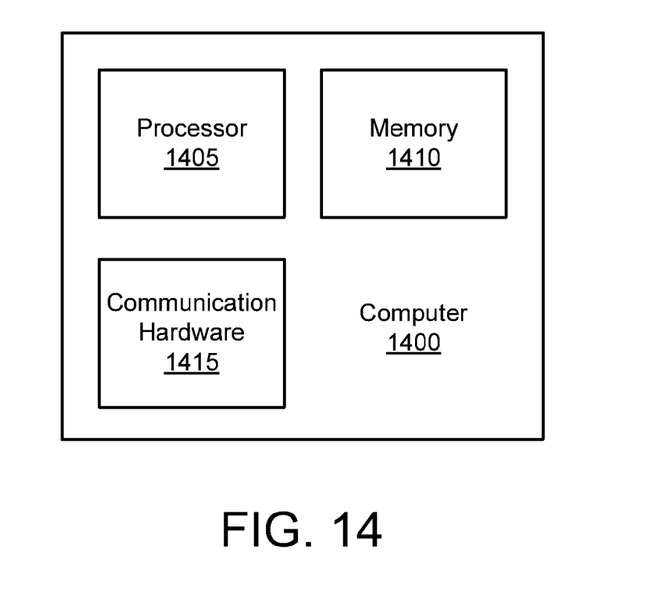
FIG. 14 is a schematic block diagram illustrating one embodiment of a computer.

FIG. 14 is a schematic block diagram illustrating one embodiment of a computer 1400. The computer 1400 includes a processor 1405, a memory 1410, and communication hardware 1415. The computer 1400 may be fabricated of semiconductor gates as is well known to those of skill in the art. Alternatively, the processor 1405, the memory 1410, and the communication hardware 1415 may each be separately fabricated as semiconductor gates and communicate over one or more data lines.

The memory 1410 may store computer readable program code. The processor 1405 may execute the computer readable program code. The communication harder 1415 may receive information such as timing pulses for the laser and communicate instructions, such as a change in the aspect ratio. The computer 1400 may be embodied in the projector 105. In one embodiment, the computer 1400 comprises the measurement module 905 and the adjustment module 910.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a measurement module measuring distances from a projector to each of at least three projected points of a first projected image projected on a first surface with projection angles between each projected point, wherein the at least three projected points are endpoints for at least two vectors with a target ratio of vector lengths; and
 an adjustment module calculating an actual ratio of actual vector lengths of the at least two vectors and adjusting a first aspect ratio of first projected image until the actual ratio is equivalent to the target ratio.

2. The apparatus of claim 1, wherein the projector renders the first projected image with at least one laser beam and the measurement module measures the distances to each of the at least three projected points using a measurement method selected from the group consisting of laser Doppler velocimetry measurements, time-of-flight measurements, phase shift measurements, and interferometer measurements.

3. The apparatus of claim 1, wherein the first projected image is a portion of a global image comprising a plurality of projected images projected on a global surface comprising a plurality of surfaces, the adjustment module adjusting an aspect ratio for each projected image.

4. The apparatus of claim 1, wherein the length of each vector is calculated as $$a' = \frac{b\mathrm{Sin}(A')}{\mathrm{Sin}(B')}$$

where A' is a first projection angle between a first projected point and a second projected point, b is a distance from the projector to the first projected point, c' is a distance from the first projected point to the second projected point, and $$B' = \mathrm{Sin}^{-1}\left(\frac{b\mathrm{Sin}(A')}{\sqrt{b^2 + c'^2 - 2bc'\mathrm{Cos}(A')}}\right).$$

5. The apparatus of claim 1, wherein each of the at least three projected points is individually projected on the first surface and the distance from the projector to the projected point is measured as the projected point is projected on the first surface.

6. The apparatus of claim 1, wherein the first aspect ratio is adjusted by changing a parameter selected from a pixel aspect ratio, intra-pixel spacing, and a pixel shape.

7. The apparatus of claim 1, wherein the target ratio comprises a ratio of virtual vector lengths for virtual vectors between the at least three projected points simulated on a virtual surface that is planar and normal to a central projection vector of the projector.

8. A machine implemented method comprising:
measuring distances from a projector to each of at least three projected points of a first projected image projected on a first surface with projection angles between each projected point, wherein the at least three projected points are endpoints for at least two vectors with a target ratio of vector lengths;
calculating an actual ratio of actual vector lengths of the at least two vectors; and
adjusting a first aspect ratio of first projected image until the actual ratio is equivalent to the target ratio.

9. The method of claim 8, wherein the projector renders the first projected image with at least one laser beam and measures the distances to each of the at least three projected points using a measurement method selected from the group consisting of laser Doppler velocimetry measurements, time-of-flight measurements, phase shift measurements, and interferometer measurements.

10. The method of claim 8, wherein the first projected image is a portion of a global image comprising a plurality of projected images projected on a global surface comprising a plurality of surfaces, the method comprising adjusting an aspect ratio for each projected image.

11. The method of claim 8, wherein the length of each vector is calculated as $$a' = \frac{b\mathrm{Sin}(A')}{\mathrm{Sin}(B')}$$

where A' is a first projection angle between a first projected point and a second projected point, b is a distance from the projector to the first projected point, c' is a distance from the first projected point to the second projected point, and $$B' = \mathrm{Sin}^{-1}\left(\frac{b\mathrm{Sin}(A')}{\sqrt{b^2 + c'^2 - 2bc'\mathrm{Cos}(A')}}\right).$$

12. The method of claim 8, wherein each of the at least three projected points is individually projected on the first surface and the distance from the projector to the projected point is measured as the projected point is projected on the first surface.

13. The method of claim 8, wherein the first aspect ratio is adjusted by changing a parameter selected from a pixel aspect ratio, intra-pixel spacing, and a pixel shape.

14. The method of claim 8, wherein the target ratio comprises a ratio of virtual vector lengths for virtual vectors between the at least three projected points simulated on a virtual surface that is planar and normal to a central projection vector of the projector.

15. A computer program product comprising a non-transitory computer readable storage medium storing a computer readable program code executed to perform operations comprising:
measuring distances from a projector to each of at least three projected points of a first projected image projected on a first surface with projection angles between each projected point, wherein the at least three projected points are endpoints for at least two vectors with a target ratio of vector lengths;
calculating an actual ratio of actual vector lengths of the at least two vectors; and
adjusting a first aspect ratio of first projected image until the actual ratio is equivalent to the target ratio.

16. The computer program product of claim 15, wherein the projector renders the first projected image with at least one laser beam and measures the distances to each of the at least three projected points using a measurement method selected from the group consisting of laser Doppler velocimetry measurements, time-of-flight measurements, phase shift measurements, and interferometer measurements.

17. The computer program product of claim 15, wherein the first projected image is a portion of a global image comprising a plurality of projected images projected on a global surface comprising a plurality of surfaces, the operations adjusting an aspect ratio for each projected image.

18. The computer program product of claim 15, wherein the length of each vector is calculated as $$a' = \frac{b\mathrm{Sin}(A')}{\mathrm{Sin}(B')}$$

where A' is a first projection angle between a first projected point and a second projected point, b is a distance from the projector to the first projected point, c' is a distance from the first projected point to the second projected point, and $$B' = \mathrm{Sin}^{-1}\left(\frac{b\mathrm{Sin}(A')}{\sqrt{b^2 + c'^2 - 2bc'\mathrm{Cos}(A')}}\right).$$

19. The computer program product of claim 15, wherein each of the at least three projected points is individually projected on the first surface and the distance from the projector to the projected point is measured as the projected point is projected on the first surface.

20. The computer program product of claim 15, wherein the first aspect ratio is adjusted by changing a parameter selected from a pixel aspect ratio, intra-pixel spacing, and a pixel shape.

* * * * *